July 1, 1941.   D. M. PAXTON   2,247,520
CHECK VALVE
Filed June 13, 1939
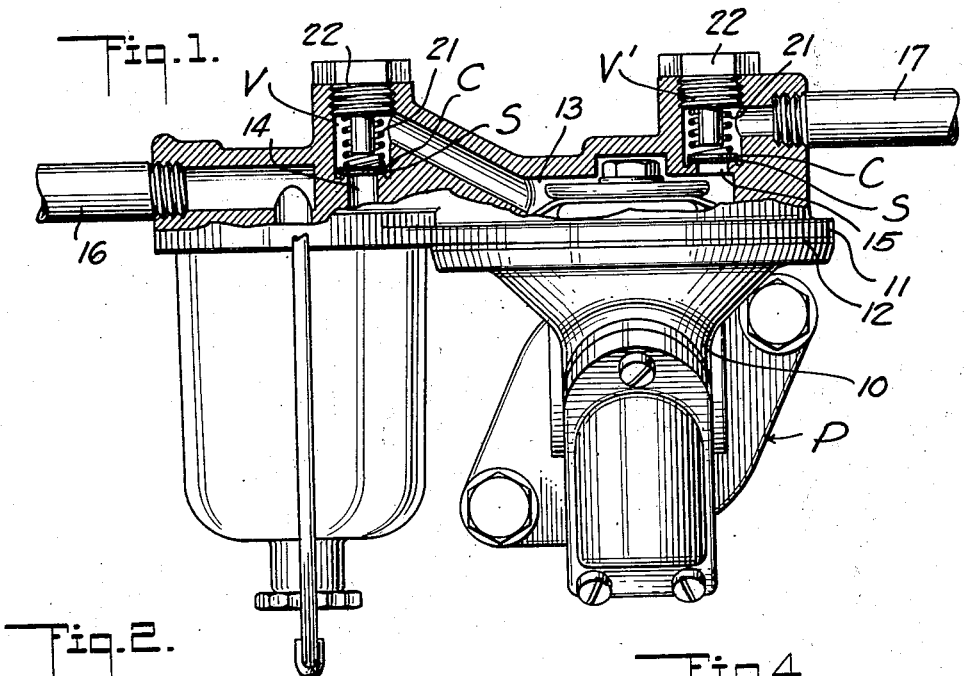
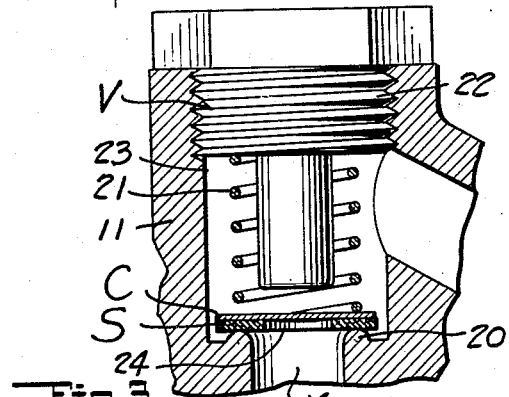
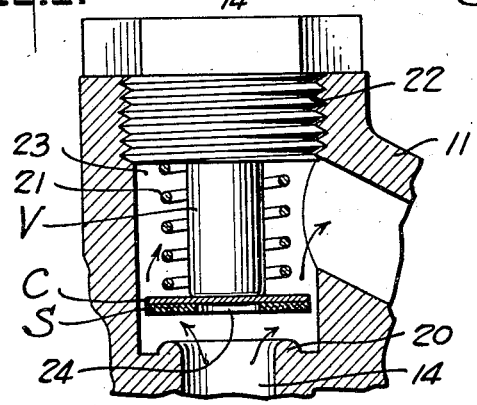
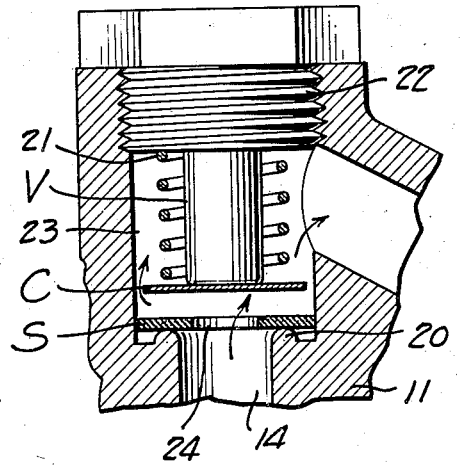
INVENTOR
DEWEY M. PAXTON
BY
Munn, Anderson & Liddy
ATTORNEYS Patented July 1, 1941

2,247,520

UNITED STATES PATENT OFFICE 2,247,520

CHECK VALVE

Dewey M. Paxton, Los Angeles, Calif., assignor, by mesne assignments, to Curtis - Anti - Vapor Pumps, Inc., Los Angeles, Calif., a corporation of California Application June 13, 1939, Serial No. 278,817

2 Claims. (Cl. 251—144)

This invention relates generally to valves for controlling the flow of fluids in flow lines, and more particularly to check valves as used in pumping mechanisms and other devices wherein uni-directional or progressive flow of fluid in a conduit is effected.

An object of this invention is to provide a check valve which is structurally characterized in a simple manner enabling it to form a fluid-tight seal in a closed position to which it is normally urged, yet will infallibly open to permit fluid to flow in one direction, all irrespective of abnormal or exceptional operating conditions involving excessively heated fluid or surrounding structure producing sufficient deformation of a flexible, non-metallic sealing closure of the valve, to otherwise cause the valve to stick in closed position with the attending clogging of the flow line.

Another object of the invention is to provide a check valve which is particularly adapted, although not necessarily, for use in fuel pumps of engines operating on gasoline or other hydrocarbon fuels having an unavoidable deforming or swelling action by heat, on the most desirable flexible or elastic materials from which to construct a fluid-tight sealing closure element, and which check valve is so structurally characterized as to enable it to utilize such material to obtain an absolute fluid-tight seal in the closed position of the valve, yet to open without fail in order that pumping of the fluid will be effected, irrespective of such swelling of the material as would cause the closure element constructed therefrom to stick in closed position.

A further object of the invention is to provide a check valve which can be applied to existing fuel pumps without altering the construction thereof in any manner, and which can be manufactured at negligible cost.

With these and other objects in view, the invention resides in the combinations and arrangements of elements as set forth in the following specification and particularly pointed out in the appended claims.

In the accompanying drawing.

Figure 1 is a view partly in vertical section and partly in side elevation, of a fuel pump with the check valve embodying this invention installed therein;

Figure 2 is an enlarged fragmentary sectional view of the check valve in closed position;

Figure 3 is a view similar to Figure 2, showing the check valve in one open position;

Figure 4 is a view similar to Figure 2, showing the check valve in another open position.

For the purpose of illustration, the invention in its present embodiment is shown associated with a fuel pump P of the type commonly employed for the pumping of liquid fuel such as gasoline, to the carburetor of an automobile engine, from a suitable storage tank on the vehicle. However, it will be clearly understood that the invention is capable of a wide range of use in pumping mechanisms and other devices in which check valves are employed to control flow of a fluid uni-directionally in a flow line.

The pump P generally comprises a body 10 to which is secured a head 11, with a flexible diaphragm 12 clamped between the two for co-action with the head in defining a pumping chamber 13 having an inlet port 14 and an outlet port 15, respectively connected by pipes 16 and 17 to the fuel tank and float chamber of a carburetor in the fuel supply system of an engine (not shown). The diaphragm 12 is adapted to be flexed in one direction and then the other, for co-action with check valves V and V' in effecting a pumping action in the chamber 13 so that fuel will be pumped through the chamber from the fuel tank to the carburetor. Any suitable engine driven mechanism can be employed for actuating the diaphragm, an example of such mechanism being disclosed in U. S. Patent No. 1,905,207, issued to Abraham M. Babitch et al.

The check valves V and V' embody the present invention and are identical in construction so that for the purpose of this disclosure a detailed description of one valve will suffice.

The check valve comprises a sealing element S and a closure element C, the sealing element being constructed of a disk of yieldable or elastic sheet material of a type which is proof against deterioration by gasoline or other hydrocarbon fluid. One type of such material is manufactured and sold under the name "Neoprene" and is a highly efficient substance to obtain a fluid-tight seal against a seat such as the annular seat 20 surrounding the inlet port 14 or the outlet port 15.

The closure element C is a disk of sheet metal and protects the sealing element by receiving the thrust of a coil spring 21 which directly abuts the closure element and a plug 22 threaded into the wall of the valve chamber 23 so that the two elements, while free of each other in radial directions, are normally urged as a unit to effect a fluid-tight seal of the sealing element S against the seat 20.

Although an elastic material such as "Neoprene" is the most desirable for use in obtaining a fluid-tight seal to eliminate vapor lock, and also successfully resist deterioration by gasoline, such material is subject to deformation under the influence of heat. Thus, under certain conditions of operation of an engine, during which abnormal heat is generated, the resulting heating of the gasoline and/or pump is sufficient to cause swelling or expansion of the sealing element, which is not injurious thereto, as the element will contract without physical change, to its normal size, when cooler conditions are restored.

However, such expansion of the sealing element by heat may, if sufficient, adversely affect the operation of the valve, due to the fact that a sealing element of the minimum diameter permissible for effective sealing engagement with the seat 20 throughout its circumference may temporarily expand radially a sufficient amount to stick in the chamber 23 by becoming jammed tightly against the wall thereof. It will be appreciated that the diameters of the seat 20 and the chamber 23 with respect to each other and to the diameter of the sealing element can only vary within a narrow range, as otherwise the sealing element will not be guided by the wall of the chamber 23 sufficiently to be retained substantially in fluid-tight sealing relationship to the seat throughout its circumference.

Therefore, it will be evident that should the sealing element stick in closed position, proper pumping action will cease and the line become clogged by closing of the port controlled by the valve.

In order to permit the successful use of "Neoprene" or similar material for the sealing element and yet nullify the adverse effect of the element becoming temporarily stuck in the chamber 23, the sealing element is provided with a centrally located by-pass port 24. In the event of the sealing element sticking in its closed position, as shown in Figure 4, during such stroke of the pump as would normally cause the elements C and S to move as a unit and open the port 14 or 15 against the action of the spring 21, as shown in Figure 3, the port 24 permits the flow of fluid past the valve, as the fluid pressure will then act upon the closure element C to unseat same from the sealing element against the action of the spring 21, as shown in Figure 4. Thus, it will be clear that although the closure element normally is in fluid-sealing engagement with the elastic seat formed by the confronting face of the sealing element, it will function in conjunction with the by-pass port 24 to insure the pumping of fluid through such port until the sealing element contracts sufficiently to be free of the wall of the valve chamber, upon which the normal condition of operation is restored.

It will be manifest that the combination, arrangement and functional relationship of elements as above described enable the most efficient and desirable material obtainable to be used in the check valve to obtain the essential fluid-tight seal at the port 14 or 15 in order to prevent vapor lock and loss of pumping efficiency.

What is claimed is:

1. In mechanism of the class described, a check valve comprising a cylindrical chamber having a port and an annular seat bounding same; a sealing element of yieldable material adapted for fluid sealing engagement with said seat and being of such diameter to be guided solely by the wall of the chamber and be maintained in radial directions thereby in a fluid-tight sealing relationship to said seat throughout its circumference, the minimum permissible diameter of the sealing element to maintain its aforestated relationship to the seat being greater than will prevent the sealing element when subjected to a normal temperature, from expanding radially into sticking engagement with the chamber wall; and means co-acting with the sealing element to permit the flow of fluid through said port and past the sealing element should the latter become stuck in the chamber from excessive temperature.

2. In mechanism of the class described, a check valve comprising a cylindrical chamber having a port and an annular seat bounding same; a sealing element of yieldable material adapted for fluid sealing engagement with said seat and being of such diameter to be guided solely by the wall of the chamber and be maintained in radial directions thereby in a fluid-tight sealing relationship to said seat throughout its circumference, the minimum permissible diameter of the sealing element to maintain its aforestated relationship to the seat being greater than will prevent the sealing element when subjected to a normal temperature, from expanding radially into sticking engagement with the chamber wall; the sealing element having a by-pass port therethrough; and a closure element in the chamber co-acting with the sealing element to control its by-pass port, and remaining free of the chamber wall during such conditions as would cause the sealing element to stick in the chamber, whereby to permit the closure element to open the by-pass port for the flow of fluid therethrough.

DEWEY M. PAXTON.